US008332819B2

(12) United States Patent  (10) Patent No.: US 8,332,819 B2
McFarland et al.  (45) Date of Patent: Dec. 11, 2012

(54) DIAGNOSTIC AND TROUBLE-SHOOTING METHODS IN A WIRELESS CONTROL AND SENSOR NETWORK

(75) Inventors: Norman R. McFarland, Palatine, IL (US); Geoffrey D. Nass, Rolling Meadows, IL (US); Pornsak Songkakul, Mequon, WI (US)

(73) Assignee: Siemens Industry, Inc., Alpharetta, GA (US)

( * ) Notice: Subject to any disclaimer, the term of this patent is extended or adjusted under 35 U.S.C. 154(b) by 1257 days.

(21) Appl. No.: 12/114,766

(22) Filed: May 3, 2008

(65) Prior Publication Data

US 2008/0276127 A1  Nov. 6, 2008

Related U.S. Application Data

(60) Provisional application No. 60/915,710, filed on May 3, 2007, provisional application No. 61/035,109, filed on Mar. 10, 2008.

(51) Int. Cl.
*G06F 9/44*  (2006.01)

(52) U.S. Cl. ........ 717/124; 717/126; 717/127; 717/140; 714/37; 714/38.1; 711/117; 711/158; 709/218

(58) Field of Classification Search .................. 717/124
See application file for complete search history.

(56) References Cited

U.S. PATENT DOCUMENTS

| | | | | |
|---|---|---|---|---|
| 4,841,434 A * | 6/1989 | Mathewes et al. | ............ | 712/227 |
| 4,989,132 A * | 1/1991 | Mellender et al. | ............ | 717/139 |
| 5,202,985 A * | 4/1993 | Goyal | ............ | 709/218 |
| 5,210,859 A * | 5/1993 | Aoshima et al. | ............ | 714/46 |
| 5,584,009 A * | 12/1996 | Garibay et al. | ............ | 711/117 |
| 5,634,098 A * | 5/1997 | Janniro et al. | ............ | 714/38.1 |
| 5,784,553 A * | 7/1998 | Kolawa et al. | ............ | 714/38.1 |
| 5,915,083 A * | 6/1999 | Ponte | ............ | 714/30 |
| 5,991,543 A * | 11/1999 | Amberg et al. | ............ | 717/175 |
| 6,182,279 B1 * | 1/2001 | Buxton | ............ | 717/100 |
| 6,202,172 B1 * | 3/2001 | Ponte | ............ | 714/31 |
| 6,272,672 B1 * | 8/2001 | Conway | ............ | 717/107 |
| 6,401,220 B1 * | 6/2002 | Grey et al. | ............ | 714/33 |
| 6,553,565 B2 * | 4/2003 | Click et al. | ............ | 717/129 |
| 6,643,842 B2 * | 11/2003 | Angel et al. | ............ | 717/130 |
| 6,721,941 B1 * | 4/2004 | Morshed et al. | ............ | 717/127 |
| 6,901,586 B1 * | 5/2005 | Czajkowski | ............ | 717/151 |

(Continued)

FOREIGN PATENT DOCUMENTS

EP   1248168 A2   10/2002

(Continued)

OTHER PUBLICATIONS

Title: Embedded controller software and algorithm development tool, author: Correa, C.R et al, source: IEEE, dated: 2001.*

(Continued)

*Primary Examiner* — Chameli Das

(57) ABSTRACT

A method of performing diagnostics on a first hierarchical device operable within a building automation system is disclosed. The method includes compiling application code configured to control the first hierarchical device such that the application code includes a plurality of internal variables, providing a diagnostic module configured to monitor the plurality of internal variables, collecting internal variable diagnostic data related to the monitored plurality of internal variables, uploading the collected internal variable diagnostic data to a second hierarchical device, performing, at the second first hierarchical device, a layered diagnostic analysis on the internal variable diagnostic data, and identifying a first hierarchical device problem based on the analyzed internal variable diagnostic data.

16 Claims, 6 Drawing Sheets

U.S. PATENT DOCUMENTS

| | | | |
|---|---|---|---|
| 7,058,929 B2 * | 6/2006 | Charnell et al. | 717/135 |
| 7,305,456 B2 * | 12/2007 | Kobayashi | 709/218 |
| 7,383,985 B1 * | 6/2008 | Aisa | 235/376 |
| 7,421,562 B2 * | 9/2008 | Bhatt et al. | 711/203 |
| 7,464,373 B1 * | 12/2008 | Yunt et al. | 717/125 |
| 7,774,172 B1 * | 8/2010 | Yunt et al. | 703/2 |
| 7,921,412 B1 * | 4/2011 | Laura | 717/127 |
| 8,032,409 B1 * | 10/2011 | Mikurak | 705/14.26 |
| 8,055,358 B2 * | 11/2011 | Blevins et al. | 700/28 |
| 2002/0087949 A1 * | 7/2002 | Golender et al. | 717/124 |
| 2002/0104077 A1 * | 8/2002 | Charnell et al. | 717/162 |
| 2002/0112044 A1 * | 8/2002 | Hessmer et al. | 709/223 |
| 2003/0023336 A1 * | 1/2003 | Kreidler et al. | 700/108 |
| 2004/0160464 A1 * | 8/2004 | Reyna | 345/854 |
| 2005/0010912 A1 * | 1/2005 | Adolphson et al. | 717/151 |
| 2005/0034014 A1 * | 2/2005 | Moser et al. | 714/17 |
| 2005/0182655 A1 * | 8/2005 | Merzlak et al. | 705/2 |
| 2006/0161897 A1 * | 7/2006 | Biberstein et al. | 717/124 |
| 2008/0120620 A1 * | 5/2008 | Lett et al. | 718/103 |
| 2009/0216910 A1 * | 8/2009 | Duchesneau | 709/250 |
| 2010/0122052 A1 * | 5/2010 | Waldspurger et al. | 711/162 |
| 2011/0138319 A1 * | 6/2011 | Sidman | 715/781 |
| 2012/0089410 A1 * | 4/2012 | Mikurak | 705/1.1 |

FOREIGN PATENT DOCUMENTS

| | | |
|---|---|---|
| EP | 1248168 A3 | 10/2002 |
| WO | WO 01/28067 A1 | 4/2001 |
| WO | WO 2005/057302 A2 | 6/2005 |

OTHER PUBLICATIONS

International Search Report dated Jul. 25, 2008 for Application No. PCT/US2008/005761.

* cited by examiner

| | OUT-OF-LIMIT SINCE POWER UP (Y/N) | (8 Y/N FLAGS PER BYTE) |
| --- | --- | --- |
| | OUT-OF-LIMIT THIS TIME INCREMENT (Y/N) | (8 Y/N FLAGS PER BYTE) |

| START TIME | LAST TIME | LAST VALUE | OVERHEAD |
| # OCCURRED | IN # TICKS | SCALAR OFFSET | OVERHEAD |
| # SAMPLES | SUM X | SUM X**2 | OVERHEAD |
| SUM X3 | SUM X4 | | |
| DATE TIME | | VALUE | OVERHEAD |
| DATE TIME | | VALUE | WATCH #1 | WATCH #2 |

FIG. 4

DIAGNOSTIC AND TROUBLE-SHOOTING METHODS IN A WIRELESS CONTROL AND SENSOR NETWORK

CROSS-REFERENCE TO RELATED APPLICATIONS

This patent claims the priority benefit under 35 U.S.C. §119(e) of U.S. provisional patent application Ser. No. 60/915,710 (2007P09009US), filed on May 3, 2007; and U.S. provisional patent application Ser. No. 61/035,109 (2008P004472US), filed on Mar. 10, 2008 the content of which is hereby incorporated by reference for all purposes.

This patent relates to co-pending U.S. patent application Ser. No. 11/590,157 (2006P18573 US), filed on Oct. 31, 2006, and co-pending U.S. patent application Ser. No. 10/915,034 (2004P13093 US), filed on Aug. 8, 2004, the contents of these applications are hereby incorporated by reference for all purposes.

BACKGROUND

Typical embedded systems, including those networked together, and especially those wirelessly networked together, can be complex and difficult to trouble-shoot when problems arise. Problems when detected and/or visible typically require speedy resolution by the system operator or provider.

Experience shows that without built-in diagnostics, it is almost difficult to determine the root cause of problems in wireless control and sensor networks (WCSN), e.g., even in a "simple" wireless device, problems can occur in one of many possible locations such as: (1) the radio hardware, (2) the radio firmware, (3) the application processor, (4) the wireless stack firmware, (5) the wireless application firmware, and (6) the communication channel between the radio processor and application processor. In addition, since wireless devices and/or building automation components can be deployed in inaccessible locations (such as in the ceiling plenum or in locked offices or equipment closets), taking advantage of wireless device's wireless communication channel makes trouble-shooting much easier, efficient, and practical.

It is known to provide modern embedded products with built-in diagnostics, allowing the user to diagnose day-to-day problems without needing to call for outside service. Outside service personnel often have additional or extended diagnostics capabilities or tool to diagnose system level issues such as communications. In many situations, a third level of "remote" over-the-internet diagnostics is available to the service personnel to provide an in-depth analysis of the wireless device's and/or system's operations.

SUMMARY

Methods and devices for wirelessly diagnosing and trouble-shooting problems in a wireless control and sensor network (WCSN) are disclosed herein. The disclosed diagnostic functionality provides for the identification and resolution of problems or errors within the WCSN based on an analysis of internal variables associated with devices within the WCSN. The disclosed method and device may save the user time and money, provide fast problem resolution and enhance the customer experience.

In an embodiment, a method of performing diagnostics on a first hierarchical device operable within a building automation system is disclosed. The method includes compiling application code configured to control the first hierarchical device such that the application code includes a plurality of internal variables, providing a diagnostic module configured to monitor the plurality of internal variables, collecting internal variable diagnostic data related to the monitored plurality of internal variables, uploading the collected internal variable diagnostic data to a second hierarchical device, performing, at the second first hierarchical device, a layered diagnostic analysis on the internal variable diagnostic data, and identifying a first hierarchical device problem based on the analyzed internal variable diagnostic data. In another embodiment, a hierarchical device operable within a building automation system is disclosed. The device includes a wireless communication component, a processor in communication with the wireless communication component, and a memory in communication with the processor. The memory configured to store application code executable by the processor such that application code includes a diagnostic module configured to monitor a plurality of internal variables associated with the application code, collect internal variable diagnostic data related to the monitored plurality of internal variables, and communicate the collected internal variable diagnostic data.

Other embodiments are disclosed, and each of the embodiments can be used alone or together in combination. Additional features and advantages of the disclosed embodiments are described in, and will be apparent from, the following Detailed Description and the figures.

BRIEF DESCRIPTION OF THE FIGURES

FIG. 4 illustrates exemplary diagnostic data levels;

DETAILED DESCRIPTION

Figure 1:
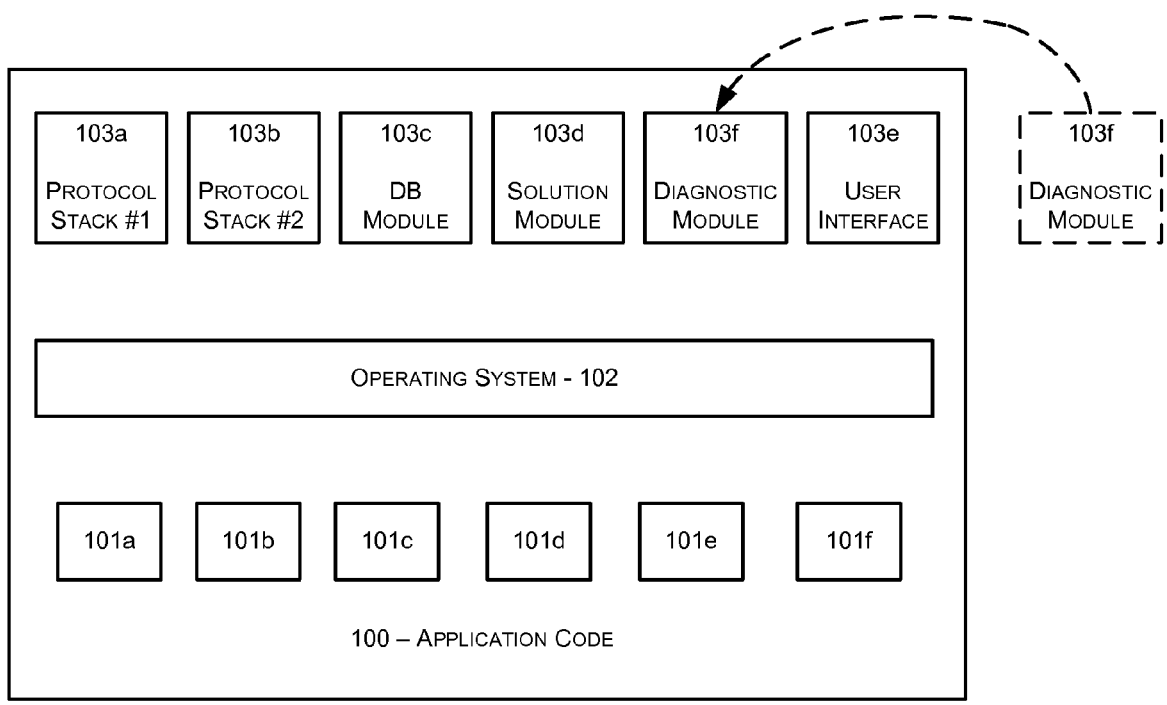
FIG. 1 illustrates a block diagram representing application code operable within a wired or wireless device which may be deployed within a building automation system.

This disclosure focuses on a fourth level of diagnostics which may be provided and or implemented by the device programmer. The fourth level or internal variable diagnostics provides a means of observing the workings of an embedded device or automation component and the software/firmware internal variables of the embedded device or automation component to determine precisely, at the application code level, the root cause of an error or job failure.

There are many reasons that an application code level of diagnostics are seldom included and/or are very limited in what they report. In particular, with hundreds of internal variables in a typical embedded system, there is neither sufficient network bandwidth or internal memory resources available to the device and/or system to track and monitor all of the internal variables. Internal variables typically change faster and/or more often than the communications time required to transmit a diagnostic message. This communication lag relative to the speed of internal variable change may result in every change not being reported or recorded.

Memory, a precious commodity in embedded controllers, may be utilized to perform, store an otherwise assist in performing diagnostics; however such usage may affect/reduce the intended application memory and the overall performances of the product. In many embedded devices or systems, the design and implementation of the diagnostics can be a larger development effort than the development of the actual application code.

A common method for diagnosing a problem is to: (i) evaluate a broad range of potential problems or errors and the variables associated with each of the errors or problems; (ii) review each of the associated variables to determine which, if any, are operating outside of their design limits; (iii) correlate the out-of-limit variables with a site-specific problem; (iv) determine the source of variance associated with the variables operating outside of its limit; (v) determine actions or a strategy to resolve or address the variance and/or site-specific problem.

Often times when failures do occur, more than one variable will be out-of-limit, possibly as an internal "chain reaction" or series of events. In these cases, it may be necessary to focus in one or more subsets of the out-of-limit variables, understand the behavior of the subset, and then analyze another subset. This diagnostic algorithm may be referred to as a prioritized analysis of variables.

Prioritizing analysis of variables is effective with visible variables, but the software internal variables may not be externally visible and can not be tracked in the same manner. Exposing and documenting the software internal variables in public documentation can result in public disclosure of trade secrets, possibly providing competition with a business and/or development advantage.

This disclosure defines a fourth level diagnostic solution for use in tracking and/or monitoring internal variables. The fourth level diagnostic solution provides a hierarchical data gathering method or solution for (1) tracking a large number of variables prioritized by the programmer when the diagnostic module is integrated into the application code, (2) balancing memory resources against the priorities of each variable, (3) allowing internal recovery operations from within the gathered data, (4) utilizing anonymous reporting methods which allows gathered data to be reported without giving away design information and (5) a user interface to allow altering of the collection methods to allow focusing on specific variable sets. This disclosure will be divided into three main sections: (I) collection of diagnostic data at the device; (II) communications and data transfer across a network; and (III) Programmer Diagnostic Tool for analyzing diagnostic data and/or altering the data collection at the source device.

I. Collection of Diagnostic Data

FIG. 1 illustrates an embodiment of a software block diagram including several code modules that may be implemented in accordance with the disclosure presented herein.

Blocks 101a to 101f depict drivers which may be utilized to, for example, interface and/or communicate various hardware input/output (I/O) functions with an operating system 102. The operating system 102, in this embodiment may be responsible for task scheduling, task execution, inter-task communications, interfacing code modules I/O requests with associated I/O driver, and other operating system functions.

Blocks 103a to 103f represent software modules or blocks of computer readable code configured or programmed to perform tasks within the devices and/or automation components. For example, block 103a may be a protocol stack for communicating with lower level system sensors and or output actuation devices. Block 103b may be a protocol stack for communicating with higher level controllers within a hierarchal system. In a ZigBee analogy, a reduced function device (RFD) could communicate with a full function device (FFD) or the FFD could communicate with another FFD or PAN Coordinator. Block 103c may be a code module implementing a database manager for internal data and variables. Block 103d may be solution code such as software, code and/or computer implemented instructions that describe customer requirements. Solution code, in other software models, has been referred to as "application code". Solution code may be utilized to differentiate the block or module 103d from the entire software package which will be referred to herein as application code 100. Block 103e may be a User Interface module allowing a user access to the device or automation component either locally through a direct hardware connection or remotely over a network through one or both protocol stacks 103a, 103b. Block 103f may be a diagnostic module or code if diagnostic code was included, enabled and/or provided within the device or automation component.

Each software block consists of lines objects and/or groups of code, typically organized as a main loop with zero to many functions following the loop. Function calls (from source points) can pass variables to the called functions or routines which can utilize the passed variables. One or more of the called functions may optionally communicate and return a value to the calling function. Functions can call other functions allowing the code to be: (1) broken down into smaller and smaller pieces with less and less complexity allowing easier testing and verification; and (2) larger and more complex functions can be constructed by calling the "simpler" functions in the required sequence.

Variables containing data may be passed to, or returned from, other functions or routines. Within the functions and main loops other variables control the flow and sequence of the function or main loop. Most of the variables within the functions and/or main loop pass internal data and not visible except within the diagnostic tools used during development. These variables may be referred to as internal variables. Each of the internal variables operates within a tested range or set of limits depending upon their use. When a variable operates with values outside of that range, their operation may be untested and sometimes erratic, due to, for example, jobsite specific issues that were outside the range of testing done in the lab, Correlating which variables are failing and how they are failing, often leads to a problem resolution at the jobsite.

FIG. 1 illustrates is an example of how software code may be viewed and/or implemented. For example, there may be more code blocks or there may be fewer code blocks, the drivers may be separated as shown or may be integrated into single or multiple driver blocks, the number of drivers may vary, the operating system may, or may not, be a separate software structure or block. FIG. 1 is intended to give background on structured code, its use of function calls to communicate between functions either within a code module or in a different module and the use of variables to pass data to or from those functions. Furthermore, FIG. 1 is intended to explain the concept of the internal variable.

Figure 2:
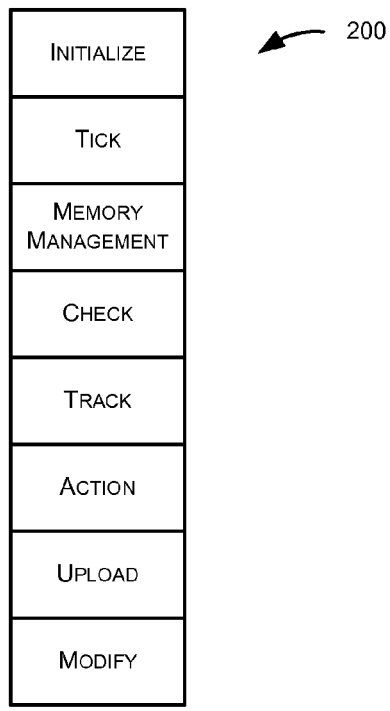
FIG. 2 illustrates an exemplary diagnostic module which may be operable with the application code shown in FIG. 1.

FIG. 2 illustrates an example of an internal block diagram of the Diagnostics Module 103f arranged to illustrate and highlight diagnostic functionality.

An INTIALIZE function 201 may be called from the application code 100 to initialize the diagnostics module 103f and its associated memories. This call could/would pass key initialization variables to the diagnostic module 103f. After execution of the INITIALIZE function 210, control may be returned to the application code 100 calling point.

A TICK function 202 may be called by the application code 100 after the elapse of a known time. The time interval may be controlled by a hardware timer, a hardware time signal, or any other source of approximately constant time interval. The TICK function 202 may count the time intervals until a diagnostic "tick" time or period has elapsed. As a point of reference, the diagnostic "tick" time may be, in one example, a five (5) minute interval. At the end of each diagnostic "tick" interval, the TICK function 202 may execute specific time-related functions.

A MEMORY MANAGEMENT function 203 may allocate and de-allocate segments of diagnostic memory granted to the diagnostic module 103f. The MEMORY MANAGEMENT function 203 may keep track of the amount of memory currently utilized and amount of memory available. Other diagnostic module 103f functions may call the MEMORY MANAGEMENT function 203 each time they need a block of memory, or are through with a block of memory.

A CHECK function 204 may be placed at each point in application code 100 where a variable is to be checked. These points or locations within the application code 100 may be referred to as checkpoints. Each checkpoint may be assigned a unique checkpoint number that pinpoints the checkpoint location within the application code. Along with the checkpoint number, the CHECK function 204 may also pass the value of the variable to be checked. Additional variables can be passed in the call, but are not checked in any way. These extra variables are considered useful information at the corresponding checkpoint. The value of the checkpoint variable is evaluated against upper and lower limits for that variable at that specific checkpoint in the application code 100. If the checkpoint variable is within limits, the function returns control to the calling point in the application code. If the variable is out-of-limit, either high or low limit, a TRACK function 205 may be called.

The TRACK function 205, in one embodiment, receives the checkpoint number, variable value, and if the variable is outside the high limit or the low limit. The TRACK function 205 updates all existing diagnostic data for the checkpoint. Details of the diagnostic data are described in more detail in connection with FIG. 5. When the TRACK function 205 has completed tasks, control may be passed to an ACTION function 206.

The ACTION function 206 may look at the "take actions when" specified for the checkpoint number and may (1) request expanding or contracting the amount of tracking done on this variable; (2) flag and indicate diagnostic data should be uploaded or provides to a higher level controller within the system architecture; and/or (3) take a corrective action to address or correct this variable's out-of-limit condition. More details on the "take actions" functions are described in connection with FIG. 3. If action is not to be taken or after the return from the action, control returns to the calling point in the application code 100. An exception to the returning to application code 100 can occur if the programmer chosen a hard reset, soft reset, or other similar "no return" actions.

An UPLOAD function 207 may be called by the application code 100 when the application code 100 is about to send a message to a higher level controller. The UPLOAD function 207 determines if there is any pending data to upload, and if so, appends the diagnostic data to the application data that is to be sent up to the maximum length of the message to be sent. In the wireless nodes or networks, this method allows the diagnostic data to hitchhike along with the normal data sent to the higher controller and saves battery life since a longer message takes less power than searching for another message interval in the network. The response message from the higher level controller acknowledges the data transfer of the diagnostic data. Control returns to the calling point in the application code 100. Some memory will be needed in the higher level controller to store the diagnostic data either permanently or until that data is sent to a final destination.

A MODIFY function 208 may be called when a message is received from a Programmer Diagnostic Tool 506 (see FIG. 5) by way of this node's next higher level controller that tells this diagnostic module 103f to modify the limits, actions, reporting, of one or more diagnostic checkpoint variables or how memory is allocated to diagnostic variables. The MODIFY function 208 allows a Programmer Diagnostic Tool 506 to alter what and how data is collected with the intent to learn more about a problem.

Figure 3:
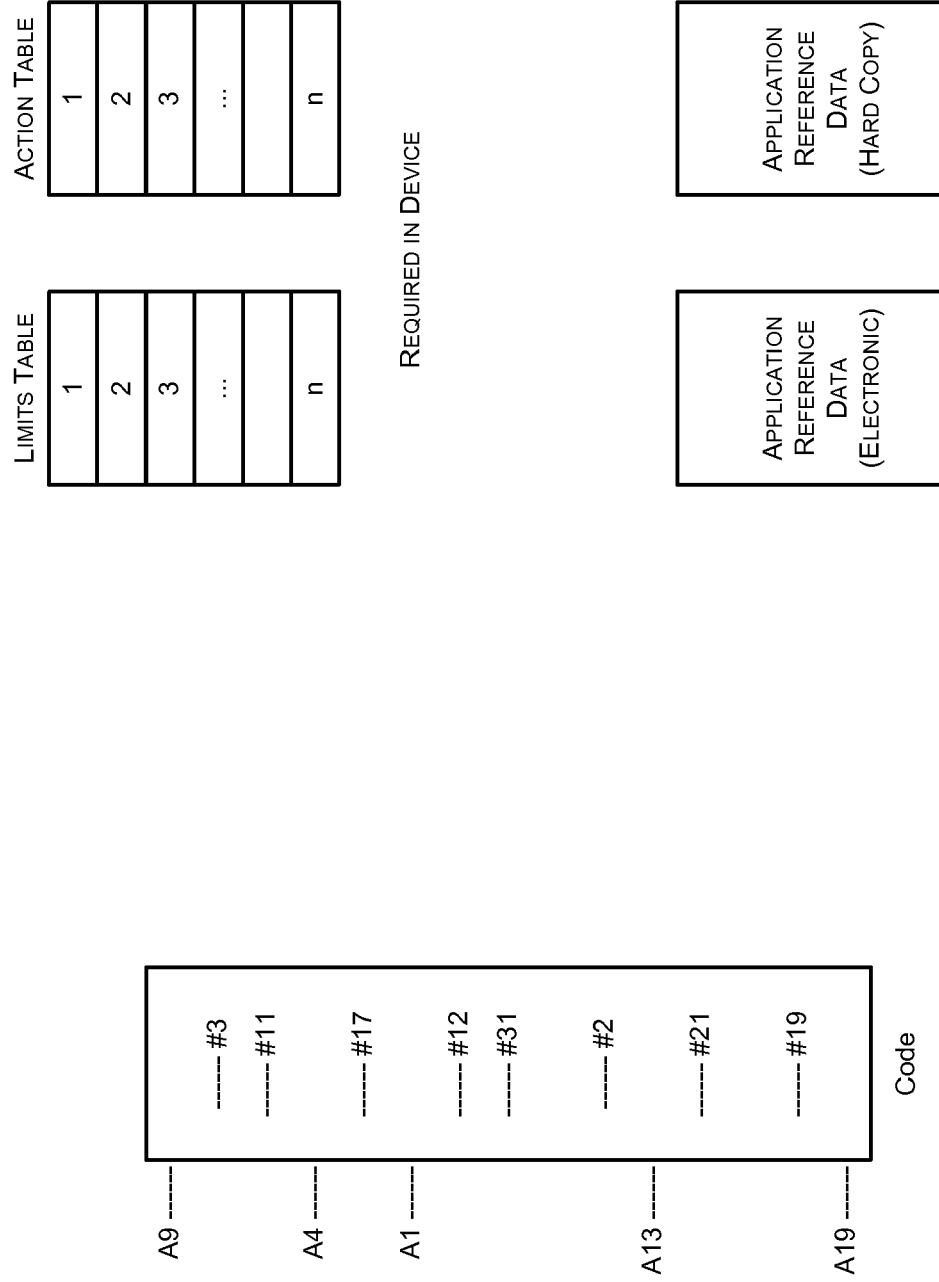
FIG. 3 illustrates an exemplary integration of a diagnostic module and application code.

FIG. 3 shows how the Diagnostic Module 103f is integrated into the application code 100. Block 301 represents either a single module of code, a concatenated view of several modules of code, or all modules of code. The short lines down the center of code 301 show places or locations where the programmer decided to insert CHECK function 204 calls, checking the limits of a single variable at each location. Each checkpoint is shown with an associated checkpoint number (for example, checkpoints #3 and #11 are listed at the top or beginning of the code 301.). These numbers should be used only once per application and link the code position to the checkpoint entry in a limits table 302. The checkpoint number may define the relative importance of this checkpoint with respect to all other checkpoints. Higher priority checkpoints maybe allocated more diagnostic tracking memory to use than lower priority checkpoints and can therefore provide or achieve better data collection information. On the left hand side of the drawing are another set of lines labeled as AXX (where XX is an identifying number) which represent function calls that the programmer deemed useful to recover from a checkpoint variable that needs a corrective action.

The limit table 302 shows the outline of the information that the programmer must provide for each checkpoint. The information may include: (1) upper limit of variable; (2) lower limit of variable; (3) conditions for expanding and or contracting the diagnostic data collection levels; (4) when should checkpoint data be uploaded to a higher level controller; (5) when should corrective action be taken and what action will be taken. Items 3, 4, and 5 are conditional statements based on values collected in the diagnostic data against diagnostic data limits the programmer has imposed. The actions to be taken is a numeric cross reference code that may be correlated in the action table 303 to get the address of the function call in the application code 100.

As will be seen later in FIG. 4, diagnostic data collection occurs in diagnostic fields. Combining these fields in various calculations allows statistical values to be determined. Numbering the diagnostic fields and the calculation results allows this information to be used as part of the ACTION function 206. For example, if the standard deviation (of a specific checkpoint variable upper or lower limit values) is greater than, for example, five (5), then call Action #3. If true, the address in the action table 303 at position three (3) can be fetched and that corrective action executed.

The action table 303 may list addresses to which program control may be transferred. They are keyed by the numeric cross reference defined in previous paragraph. When an action is required, the numeric cross reference is looked up in the action table 303, the address found, and control transfers to that function. In most cases, control returns here after the function completes and then from here control returns to the next line of the application code 100 after the current checkpoint function call.

Application reference data 304 is an optional item for the programmer that would include electronic data about the checkpoints such as names, location, use, and possible reasons for each to be out-of-limit. The information could be loaded into the Programmer Diagnostic Tool 506 to better describe the collected data source checkpoints. The information may likely to be very restricted in distribution. Alternatively, the information could be structured into layers. The customer layer may have names replacing the checkpoint numbers selected to prevent the dissemination of design related information, e.g., Checkpoint 17 becomes Timer 3. A second layer (field service) may relate the names to a code module, e.g., ZigBee stack-Timer 3. In addition a possible resolution may be suggested such as "add an additional routing node in the area near this failing device". A third layer (customer service) may give slightly more information such as "ZigBee Stack Timer 3 captures the wait time that the devices waits for network access. If too long, there may be insufficient routing in this section of the mesh network, so additional routing nodes may resolve the issue." The fourth level, developer/programmer level, may contain: (1) code module name; (2) code module line number; (3) variable name; (4) watched variable names; (5) meanings of each of the variables; (6) tested limits; (7) implied causes, etc. Although four levels are shown here for consistency with this disclosure, the number of layers are utilized to illustrate the concept and are not intended to be limiting in an manner.

An application reference document 305 may be an optional document created by the programmer to give in-depth descriptions of checkpoints, variables and reference data utilized by the service or customer support during diagnostic data collection. This "paper" or "hard copy" document is intended to be more of a true document describing internal behavior of the application module.

FIG. 4 introduces the concept of the hierarchical data model 400. The model 400 may be used once for upper limit violations and again for lower limit violations. The actual number of levels in use for a checkpoint variable at any point in time may be dependent on: (1) number of times this checkpoint has gone out-of-limit in high or low direction; (2) number of higher priority checkpoints that have gone out-of-limit, how many times they have gone out-of-limit, and how each are defined to expand their diagnostic data structure; and (3) the total memory space allocated by the programmer for diagnostic data tracking. A higher priority checkpoint that fails often will have more tracking levels and use more memory than a lower priority checkpoint that fails on occasion, lesser priority checkpoints may implement a few levels of tracking, but very low priority checkpoints may be limited in what memory they can have. On the other hand, if no higher priority checkpoints are failing, very low priority checkpoints can get a lot of memory for diagnostic tracking.

Exemplary model levels will now be described to illustrate the ways in which data can be modeled in accordance with the teaching of the present disclosure.

The exemplary model 400 will be described for a variable that is out-of-limit of the low limit side. The structure may also be available, if needed, for an out-of-limit tracking of the high limit. The low limit structure is only created and used if the checkpoint variable is below the lower limit. Similarly, the high limit structure is only created and used if the checkpoint variable is greater than the high limit.

Level 1, corresponding to the reference numeral 401, keeps track of one and only one statistic. "Has this checkpoint variable been out-of-limit on low side since the most recent power up of the device?" A bit may be set each time the variable goes out-of-limit on low side. The field is expected to be kept in a bit string with other low limit fields from the other checkpoints. Access is by checkpoint number. An optional composite bit may be included which is set on every low out-of-limit. A user could analyze the bit string to learn: (1) if any checkpoint variable has gone out-of-limit; and (2) which checkpoint variable(s) based on which bit(s) are set. If non-volatile diagnostic memory is available, the information may be expanded to instead of "since last power up" to "since device installation".

Level 2, corresponding to the reference numeral 402, may be an exact duplicate of the Level 1 structure which is controlled differently. When the diagnostic module tick timer times out for each bit set in the Level 2 field location, the "In Number Ticks" counter is incremented in Level 4 record (if record exists). After all bits are checked, the field is cleared and the tick function returns. There will be more on the "In Number Ticks" field when describing Level 4 (see reference numeral 404).

Level 3, corresponding to the reference numeral 403, is a multi-field record containing (a) start time, (b) last time, (c) last values, and (d) overhead fields. The tick timer may be configured to track and count the time of day and the number of days since power-up. The value is stored in the Start time field the first time an out-of-limit occurs. The same value is stored in the Last time field. The current value of the variable that experiences the out-of-limit state is placed in the Last value field. The overhead field may not be used and reserved for implementation details. On all successive out-of-limits for the variable, only the Last time and Last value fields will be written. From this record, one can see when the failures started and when the last one occurred (time interval) and the last failed value.

Level 4, corresponding to the reference numeral 404, also contains four fields. These fields are Number of Occurrences, In Number Ticks, Scalar Offset, and another Overhead field. Each time an out-of-limit occurs and the Level 4 record is present, the Number of Occurrences field is incremented. Each time the bit is set in the Level 2 (tick) mask 402 the In Number Ticks field is incremented when the tick timer times out. The scalar offset represents a capture of the first failed value and is used to offset all successive out-of-limit readings. This offset will typically allow more data readings to be compiled in Levels 5 and 6 before field over flow occurs (loss of data). The two counter fields in Level 4 are configured such that one counts on every failure, the other counts the number of ticks that had failures. If these two numbers are equal, the failures have occurred at greater than the tick interval. If the Number Occurred is significantly bigger than In Number Ticks value, then multiple failures are occurring within a tick time. A rough idea of how often failures occur (spread out versus bursts of failures in 1 tick) can be derived from these counts. When Level 3 Start and Last times are included, estimates of average time between failures can be approximated.

Level 5, corresponding to the reference numeral 405, contains four fields: Number Samples; Sum X Sum X2; and another Overhead field. The first field is the number of failure occurrences since the record was created. The second field is the sum of the variable values after being offset by the scalar offset value (see Level 4 at field number 3**). The third field is the sum of the squares of the offset variable value. From these three fields the mean and standard deviation of the failure values can be calculated.

The Level 6, corresponding to the reference numeral 406, contains two fields labeled Sum X3 and Sum X4. These fields, along with the Level fields can be utilized to calculate the skewness of the incoming failed data and the height of the data bell curve. Keeping in mind that, by definition, the area under the bell curve is exactly 1.000, so the higher the curve, the higher the readings, the lower the curve, the wider the readings. This differs from Standard Deviation in that skewness is accounted for using the height value.

Level 7, corresponding to the reference numeral 407, may be configured to log the collected data for later review. The logged fields may be a more accurate time stamp (if available) of date and time, the value of the checkpoint variable (unscaled), and another Overhead field. With a number of these records, a history can be determined.

Level 8, corresponding to the reference numeral 408, record logs the same data as the Level 7 field but adds the extra "watch" fields from the original Check function call. At this level of detail the reviewer can now see the variable value and the predetermined other "watch" variable values at that very point in time when the checkpoint occurred. That point in time is time stamped in the first field of the record.

The model 400 utilized the device memory in three different among the eight (8) different levels of the model. Levels 1 and 2 (401, 402, respectively), may have a dedicated amount of memory reserved for those fields. Levels 3, 4, 5, and 6 (403, 404, 405 and 406, respectively) are accumulation records. That is they accumulate data from creation until one or more of the fields overflow. The accumulated data can be reviewed and interpreted statistically. Finally, Levels 7 and 8 (407 and 408 respectively) records consume large amounts of memory for one (1) piece of very detailed information. This structure allows a device to maximize the information available while minimizing the actual amount of memory used.

II. Communication and Data Transfer

Figure 5:
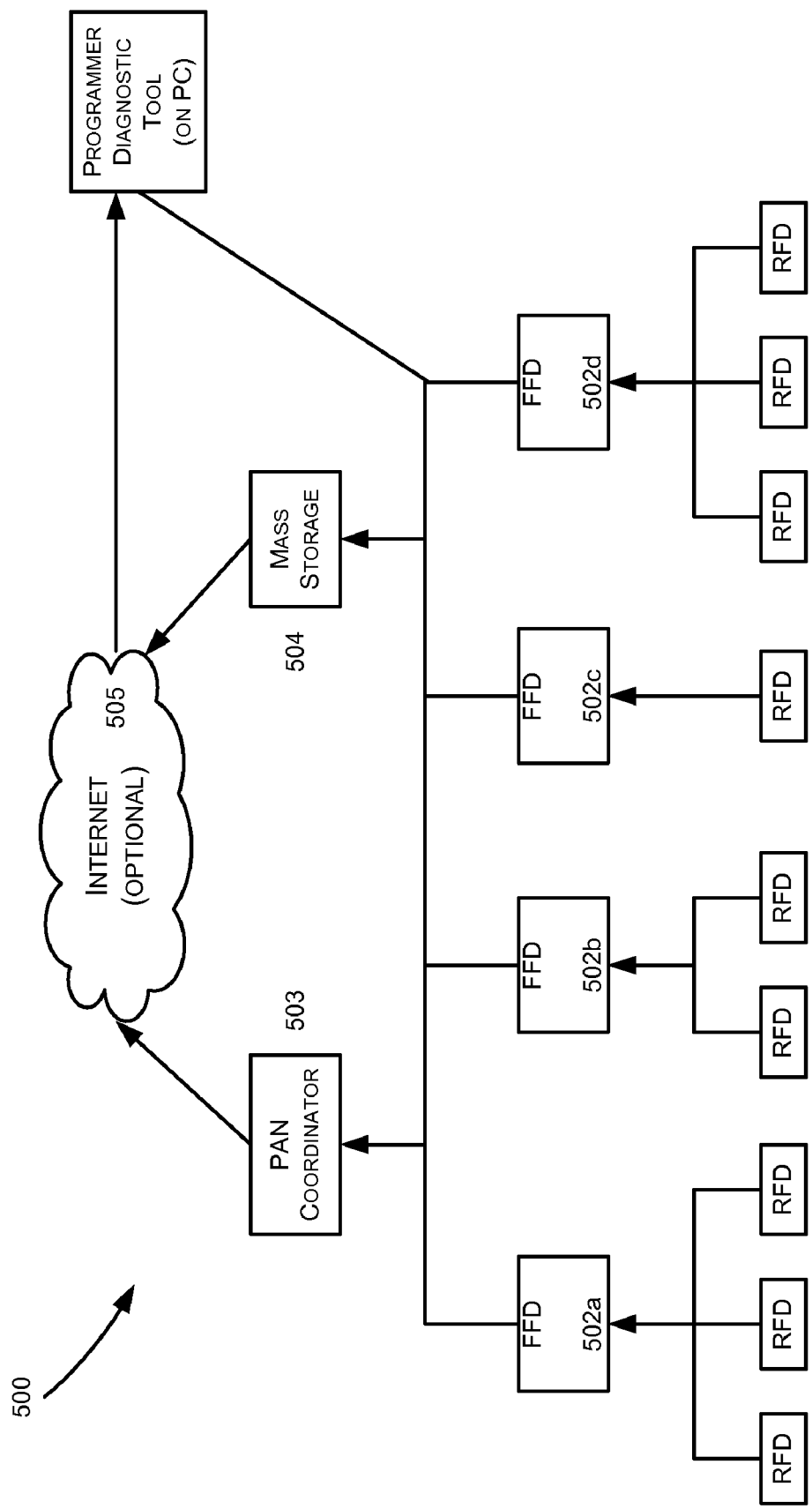
FIG. 5 illustrates an exemplary network configuration.

FIG. 5 illustrates one of many configurations of a ZigBee network and is used to describe the communications portion of this disclosure. Although ZigBee was used here, this communications model can work with almost any network or standard with one or more levels of hierarchy existing now or developed in the future. Any now known or later developed network and transport algorithms may be used for communicating between devices. Communication, transport and routing algorithms are provided on the appropriate devices. Any packet size or data format may be used.

The ZigBee network 500 shown of FIG. 5, illustrates a simple hierarchal network with reduced function device (RFD) nodes 501a to 501i that typically wake-up (become active), perform input sensing and or output actuation, and optionally report to respective full function device (FFD) 502a to 502d if needed, then go back to sleep (become inactive). If communications did occur, they are typically routed and cached at one of the FFD 502a to 502d, which then can route the communication to other more distant destinations such as the other FFD 502a to 502d, the PAN Coordinator 503, a Mass Storage Device 504, a local Programmers Diagnostic Tool 506, or through an internet interface to more distant destinations such as a remote mass storage device (not shown) or a remote Programmer Diagnostic Tool 506.

Full Function Devices (FFD) 502a to 502d are, according to ZigBee standard, always awake and active and may operate as routing nodes. FFD's 502a to 502d can route and share information with each other, with the PAN Coordinator 503, the mass storage device 504 or the Programmers Diagnostic Tool 506. FFD's also hold the last reported info from their RFD's and holds messages to be sent to their RFD's.

The Diagnostic Code Module 200 can be included or added to the application code 100 executed by any of the RFD's, the FFD's, the PAN Coordinator 503, or the Mass Storage Device 504 as described in connection with FIGS. 2, 3, and 4.

In most cases, different application code 100 may be used for each different device type 501, 502, etc. This means that each different device type has different checkpoint locations and different variables tracked. As diagnostic data is passed to other nodes, device type and network node location needs to accompany the node's diagnostic data.

A properly operating device will have no checkpoint variables going out-of-limit and therefore, have no data to upload. A node having a limited number of out-of-limit occurrences on a few variables will also have limited diagnostic data to upload. Only when variables are tracked to the detailed "instances" levels (Level 7 and 8) is there likely to be significant data passed up line.

As stated earlier, many of the nodes are RFD type and sleep, i.e., are inactive, a high percentage of the time. The RFD nodes wake-up, sense an input and or drive an output, report up-line, etc., then go back to sleep, i.e. become inactive. For the diagnostic data to be available to diagnostic tools such as the Programmer Diagnostic Tool 506, the diagnostic data (even limited amounts) must be uploaded to from the RFD to an associated FFD. The FFD either stores the uploaded data locally or passes the data along to other devices with more available memory such as other FFD 502a to 502d, the PAN Coordinator 503, the Mass Storage Device 504 or to some remote mass storage device (not shown in FIG. 5), or a remote Programmers Diagnostic Tool 506. The upload data, which is either accumulated fields or "last value" fields, may be passed from a first device to a higher level, second device. The second device can, in turn, accumulate the upload data from the first device with previously uploaded first device data of the same fields. Optionally, the second layer device can, on a regular or scheduled basis, store the accumulated data and reset the data fields to receive further uploads. The Programmers Diagnostic Tool 506 may utilize this stored accumulated data to historically analyze or review failure status, internal variable status, failure timing and/or frequency.

Uploaded diagnostic data is held at various levels in the network architecture for access and review by the Programmers Diagnostic Tool 506.

Figure 6:
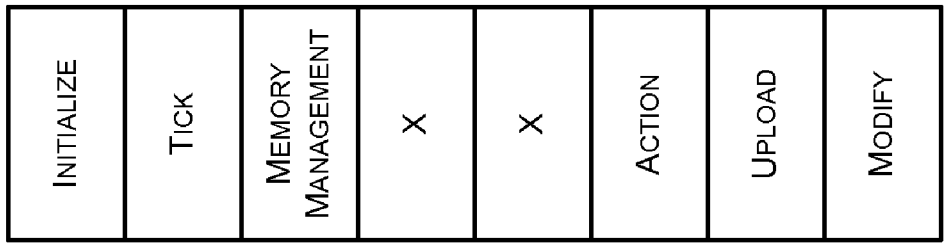
FIG. 6 illustrates an example of a diagnostic module-intermediate node.

FIG. 6 illustrates a model 600 of the software required by devices that are receiving data from a lower level device and holding or passing it on to other devices within the network 500. This model 600 is based on all the elements disclosed in connection with FIG. 2 with the CHECK function 204 and the TRACK function 205 removed. In addition, the ACTION function 606, UPLOAD function 607 and MODIFY function 608 could include additional functionality to allow receiving upload messages from a lower level device, determining if the data is stored or forwarded, then having ability to send that data on up-line. Also, the ACTION function 606 and MODIFY function 608 must be able to get commands from up line, queue them, and pass them on when the lower nodes are awake.

III. Programmers Diagnostic Tool

The Programmers Diagnostic Tool 506 may be a software package that is loaded onto a customer's service tool, a service person's service tool, a customer's computer, or used only by the development people (programmers), depending upon how much the supplier of the devices wants to expose the design internals.

The optional "electronic" and "paper" documents that the programmer may have created when the diagnostic module 103f was added to the application code 100 can now be utilized to decipher what the upload data is explaining.

It is also possible to split the amount of information loaded with the Programmers Diagnostic Tool 506 depending on who is using the tool. In this case customers would probably get very limited information while service and customer service may be given more information for deciphering the meaning of the reported data such as the information discussed in connection with application reference data 304.

Figure 7:
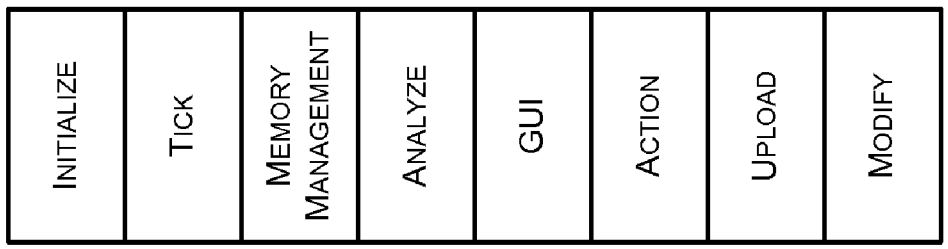
FIG. 7 illustrates an example of a programmer diagnostic tool code module.

FIG. 7 illustrates a model 700 of the Programmer Diagnostic Tool 506. Notice it also looks very similar to the diagnostic code module 103f (FIG. 2) placed in the application code 100, but like model 600 represented in FIG. 6 may be missing a few of the original functions (the CHECK function 204 and the TRACK function 205) and may include two (2) new functions, an ANALYZE function 704 and a graphical user interface (GUI) function 705.

The INITIALIZE, TICK and MEMORY MANAGEMENT functions have the same or similar functions as those discussed in connection with FIGS. 2 and 6.

The CHECK function 204, shown in FIG. 2, has been replaced in this embodiment of the model 700 with the ANALYZE function 704. The ANALYZE function 704 receives the upload data from one or more nodes, then using extended algorithms, attempts to convert the counters, and other values collected at the node and possibly accumulated (from uploads) elsewhere in the network into meaningful information that can be utilized to help diagnose the problem at the source node. Analyzed displays its information on the screen of the tool using module GUI function 705.

The GUI function 705 receives data from various sources and displays it on the screen of the device. It also allows users to enter various types of commands back to modules within the tool to modify how those modules are operating or what and how they are displaying the information.

The ACTION function 706 allows the user to command an action be taken at the node. These actions are limited to available node protocol commands plus whatever actions are included in Action table 303.

The UPLOAD function 707 may be the receiving portion of the data upload function. The UPLOAD function receives and stores the uploaded data from a node for the ANALYZE function 704 to process.

A MODIFY function 708 allows the user to make temporary or permanent changes to the limits table 304 altering how data is collected, when diagnostic levels are expanded or contracted, when uploading is performed, and how actions are taken or allowing the diagnostics module in the source node to gather all data, in and out-of-limit, allowing visualization into the entire operation of the variable at the checkpoint.

Since all the diagnostic modules 103f added to all the applications code use the same data gathering model, additional resources can be applied to the ANALYZE function 704 to allow as much inference and information can be extracted as possible.

From the information displayed or provided by the GUI function 705, along with an understanding of the device code, the disclosed algorithm, method and device solution allows reviewing and understanding actions of internal variables without giving away the design concept and allowing jobsite solutions to be achieved faster than existing trial and error methods.

Figure 8:
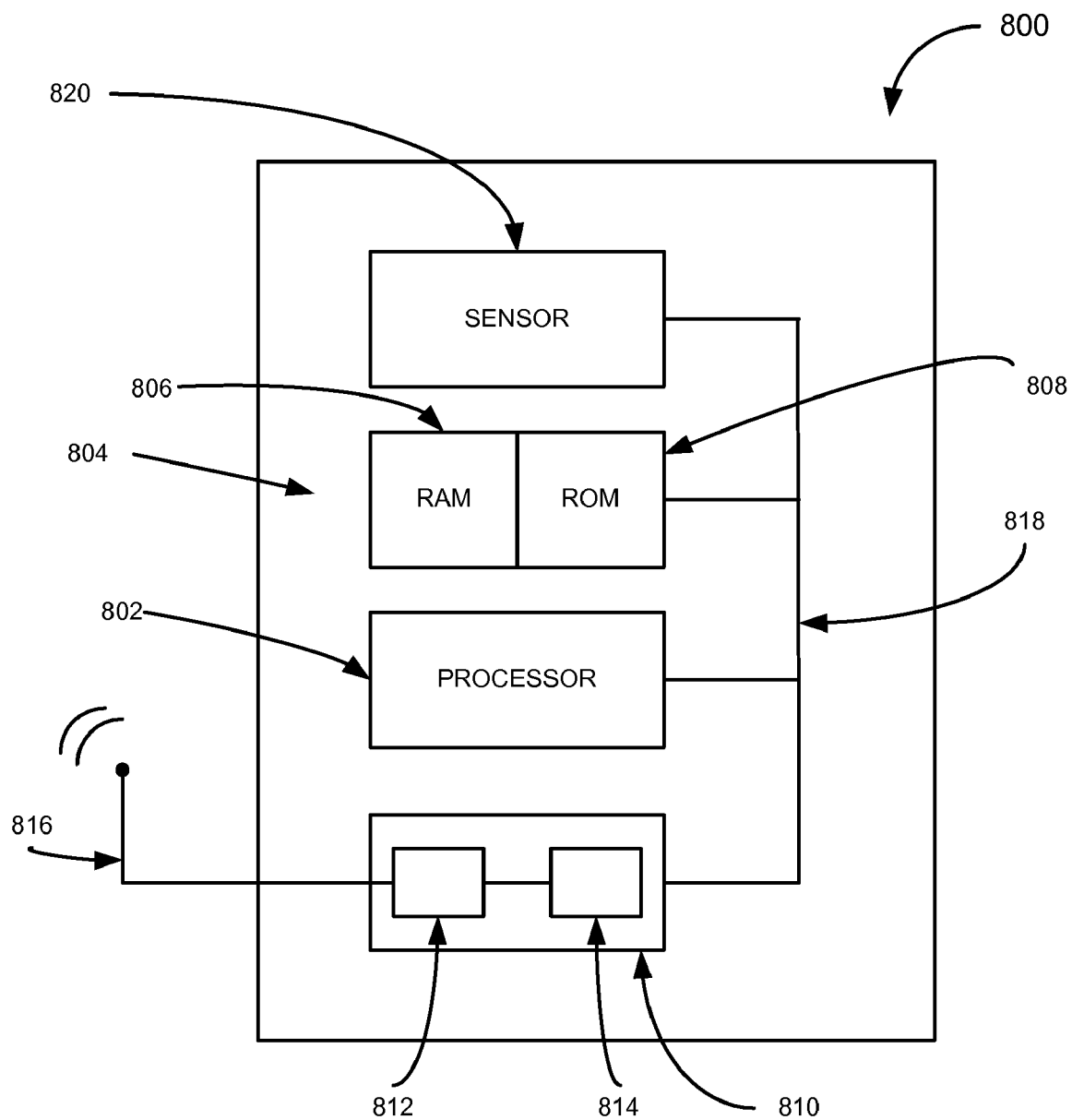
FIG. 8 illustrates an exemplary automation component or device which may implement the application code and diagnostic tool code disclosed herein.

FIG. 8 illustrates an exemplary detailed view of an automation component 800 that may execute the application code 100 and/or the Diagnostic Module 103f. The automation component 800 may be an FFD 502, an RFD 501, a PAN coordinator 503 or any other wired or wireless device. While the automation component 800 is illustrated and discussed herein, the configuration, layout and componentry may be utilized in connection with any of the devices and/or automation components deployed within the network 500 shown and discussed in connection with FIG. 5. The automation component 800 in this exemplary embodiment may include a processor 802 such as an INTEL® PENTIUM, an AMD® ATHLON™ or other 8, 12, 16, 24, 32 or 64 bit classes of processors in communication with a memory 804 or storage medium. The memory 804 or storage medium may contain random access memory (RAM) 806, flashable or non-flashable read only memory (ROM) 808 and/or a hard disk drive (not shown), or any other known or contemplated storage device or mechanism. The automation component 800 may further include a communication component 810. The communication component 810 may include, for example, the ports, hardware and software necessary to implement wired communications with the network 500. The communication component 810 may alternatively, or in addition to, contain a wireless transmitter 812 and a receiver 814 (or an integrated transceiver) communicatively coupled to an antenna 816 or other broadcast hardware.

The sub-components 802, 804 and 810 of the exemplary automation component 800 may be coupled and configured to share information with each other via a communications bus 818. In this way, computer readable instructions or code such as software, firmware, application code 100 and/or the Diagnostic module 103f may be stored on the memory 804. The processor 802 may read and execute the computer readable instructions or code via the communications bus 818. The resulting commands, requests and queries may be provided to the communication component 810 for transmission via the transmitter 812 and the antenna 816 to other automation components operating within the network 500. Sub-PAGE components 802 to 818 may be discrete components or may be integrated into one (1) or more integrated circuits, multi-chip modules, and or hybrids.

The exemplary automation component 800 may be, for example, an RFD 501 such as an WRTS deployed or emplaced within a structure. In operation, the WRTS may monitor or detect the temperature within a region or area of the structure. A temperature signal or indication representative of the detected temperature may further be generated by the WRTS. In another embodiment, the automation component 800 may be, for example, an actuator coupled to a sensor or other automation component. In operation, the actuator may receive a signal or indication from another automation component within the network 500 and adjust the position of a mechanical component in accordance with the received signal. The signal or indication may be stored or saved within the memory 804 for later processing or communication to another component within the network 500.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A method of performing diagnostics on a first hierarchical device operable within a building automation system, the method comprising:

compiling application code configured to control the first hierarchical device, wherein the application code includes a plurality of internal variables;

providing, within the application code, a diagnostic module configured to monitor the plurality of internal variables;

collecting, by a processor, internal variable diagnostic data related to the monitored plurality of internal variables;

uploading the collected internal variable diagnostic data to a second hierarchical device;

performing, at the second hierarchical device, a layered diagnostic analysis on the internal variable diagnostic data; and identifying a first hierarchical device problem based on the analyzed internal variable diagnostic data, wherein the first hierarchical device includes a memory having a diagnostic memory reserved to store the monitored plurality of internal variables, and wherein the diagnostic memory is allocated according to a priority of a checkpoint.

2. The method of claim 1, wherein a checkpoint having a lower priority is allocated less diagnostic memory than a checkpoint having a higher priority.

3. The method of claim 1, wherein uploading the collected internal variable diagnostic data includes appending the collected internal variable data to a pending network communication.

4. The method of claim 1, wherein at least some of the plurality of internal variables are not visible.

5. The method of claim 1, wherein performing a layered diagnostic analysis includes utilizing a programmer diagnostic tool.

6. The method of claim 1, wherein providing a diagnostic module further comprises providing, within the application code, an upper limit and a lower limit for the one internal variable, and collecting internal variable diagnostic data further comprises determining whether the one internal variable has been outside of the upper limit or the lower limit at the checkpoint.

7. The method of claim 1, wherein providing a diagnostic module further includes establishing, within the application code, the checkpoint.

8. The method of claim 1, wherein the diagnostic memory is allocated according to each of a plurality of layers associated with a hierarchical data logging schema.

9. A hierarchical device operable within a building automation system, the device comprising:

a wireless communication component;

a processor in communication with the wireless communication component;

a memory in communication with the processor, the memory configured to store application code executable by the processor, wherein the application code includes a diagnostic module configured to:

monitor a plurality of internal variables within the application code;

collect internal variable diagnostic data related to the monitored plurality of internal variables; and communicate the collected internal variable diagnostic data, wherein the memory includes a diagnostic memory reserved to store the monitored plurality of internal variables, and wherein the diagnostic memory is allocated based on a priority associated with a checkpoint at which one of the plurality of internal variables is to be monitored.

10. The device of claim 9 further comprising: a second hierarchical device configured for operation within a wireless network and configured to perform a layered diagnostic analysis on the internal variable diagnostic data.

11. The device of claim 10, wherein the second hierarchical device is further configured to identify a problem based on the analyzed internal variable diagnostic data.

12. The device of claim 9, wherein the internal variable diagnostic data includes the checkpoint within the application code.

13. The device of claim 9, wherein the diagnostic memory is allocated according to each of a plurality of layers associated with a hierarchical data logging schema.

14. The device of claim 9, wherein a checkpoint having a lower priority is allocated less diagnostic memory than a checkpoint having a higher priority.

15. The device of claim 9, wherein the diagnostic module is further configured to: append the collected internal variable data to a pending network communication.

16. The device of claim 9, wherein at least some of the plurality of internal variables are not visible.

* * * * *